United States Patent [19]

Rawls

[11] 4,098,936
[45] Jul. 4, 1978

[54] PRE-CURED TREAD FOR RECAPPING TIRES AND METHOD FOR THE USE THEREOF

[75] Inventor: Vaughn Rawls, Lima, Ohio

[73] Assignee: National-Standard Company, Niles, Mich.

[21] Appl. No.: 662,510

[22] Filed: Mar. 1, 1976

[51] Int. Cl.$^2$ ............................................. B29H 17/37
[52] U.S. Cl. ........................................ 428/40; 156/96; 156/129
[58] Field of Search .................. 156/96, 394, 126–129, 156/84, 267, 290, 291; 152/209 R, 209 B, 209 D, 209 WT, 213 A; 428/40, 354, 156, 343, 122

[56] References Cited

U.S. PATENT DOCUMENTS

| | | | |
|---|---|---|---|
| 1,128,480 | 2/1915 | Miller | 152/209 R |
| 1,797,187 | 3/1931 | Brittain | 152/209 R |
| 2,920,682 | 1/1960 | Lindberg | 156/267 |
| 2,976,910 | 3/1961 | Nowak | 156/96 |
| 3,236,709 | 2/1966 | Carver | 156/96 |
| 3,689,337 | 9/1972 | Schelkmann | 156/96 |
| 3,802,978 | 4/1974 | Barnett | 156/96 |
| 3,815,651 | 6/1974 | Neal | 156/96 |
| 3,846,201 | 11/1974 | Huskins | 156/96 |
| 3,895,985 | 7/1975 | Schelkmann | 156/96 |
| 3,904,459 | 9/1975 | Schelkmann | 156/96 |
| 3,919,021 | 11/1975 | Whittle | 156/267 X |
| 3,925,129 | 12/1975 | Blankenship | 156/96 |

Primary Examiner—John E. Kittle
Attorney, Agent, or Firm—Emrich, Root, O'Keeffe & Lee

[57] ABSTRACT

A pre-cured tread stock for re-capping a vehicle tire and a method for retaining the tread tightly in place on the peripheral surface of the tire casing during the curing of the tread onto the casing under heat and pressure. The tread cross-section includes a central portion and a longitudinally extending groove at each side near the respective edge or "wing," the grooves extending circumferentially around the tire casing when the tread is wrapped around and "stitched" to the casing. The grooves are of such shape that when the tread is laterally curved to fit a buffed tire casing, the outer and lower sides of the grooves extend generally upwardly in a hook-shaped profile. The method includes the steps of (1) placing a retainer around the tread stock in each of the grooves after the tread stock is wrapped around and stitched to the tire casing; (2) alternatively, (a) reducing the diameter of substantially inextensible retainers such as steel wire by tightening them against the outer sides of the grooves to squeeze the wings of the tread radially inwardly relative to and tightly against the casing and to hold them in place during the curing or (b) using resilient loop retainers which are expanded, laid in the grooves and then retract to squeeze the wings against the casing or (c) using retainers made of a material which shrinks upon heating so as to even more tightly squeeze the tread wings against the casing at the start of the curing process; (3) curing the tread stock to the casing; (4) removing the retainers after the assembly is cured and; (5) buffing or cutting off the hook-shaped material forming the lower sides of the grooves.

16 Claims, 15 Drawing Figures

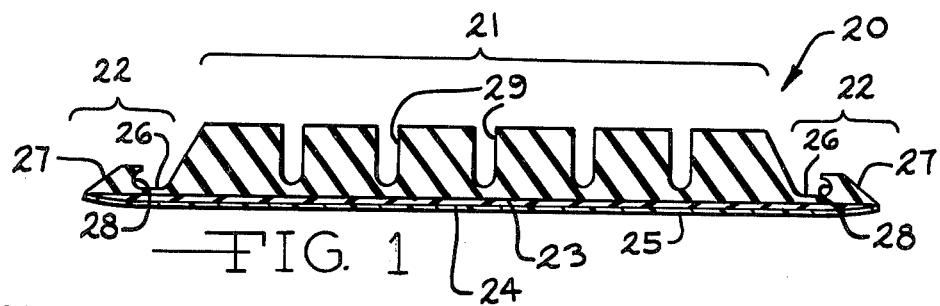
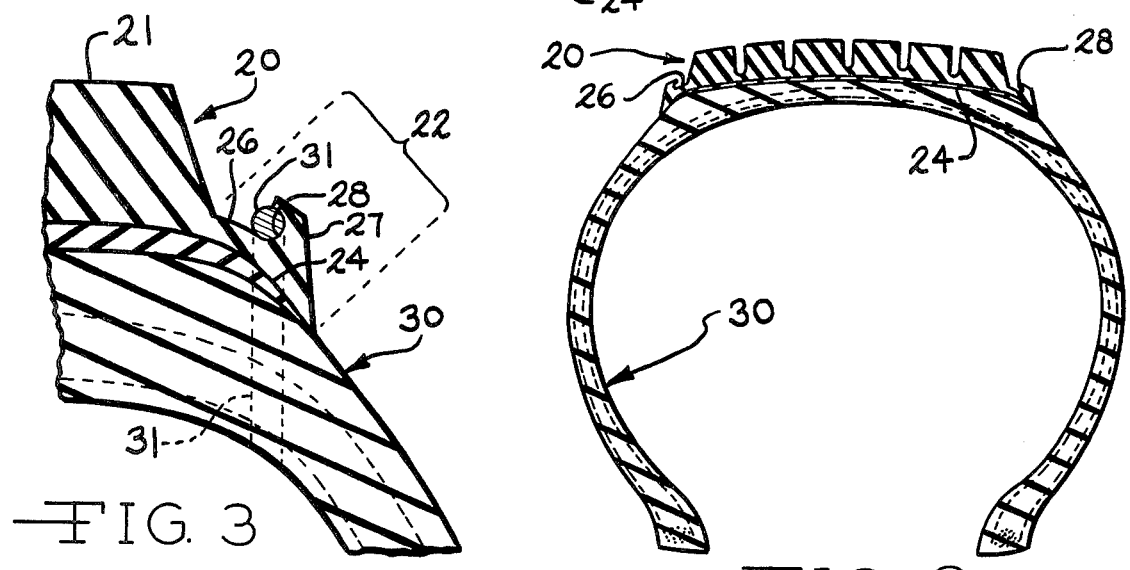
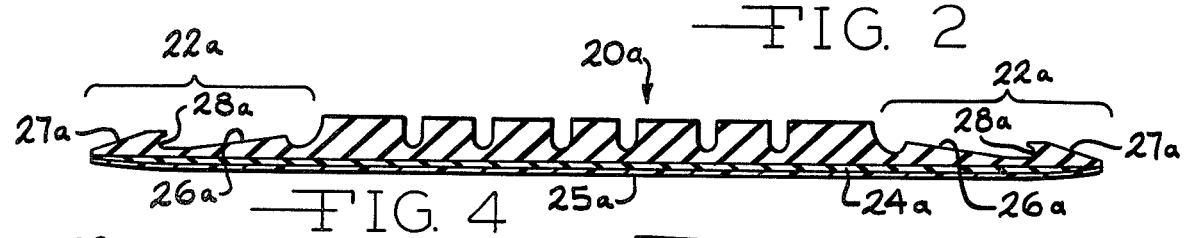
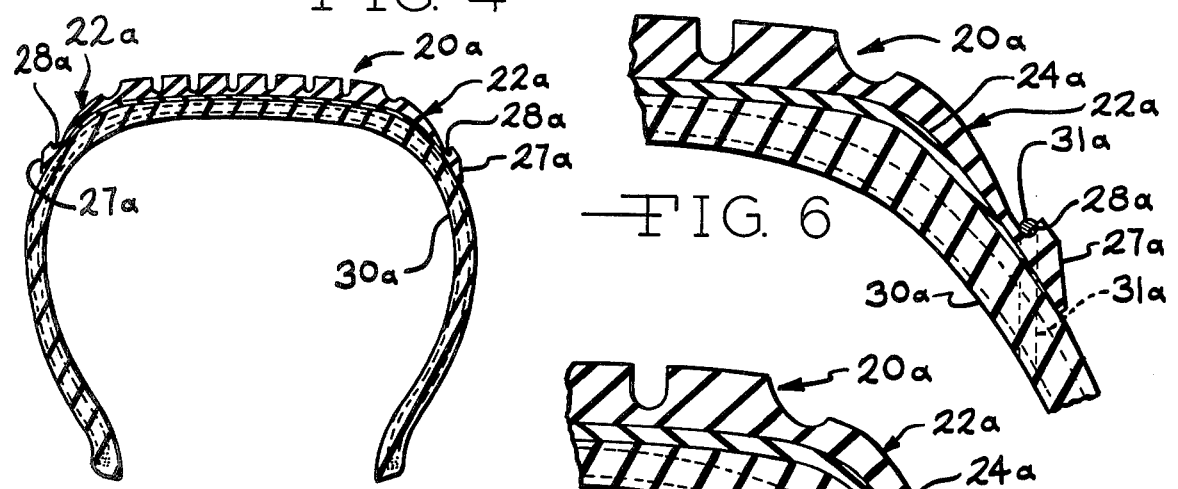

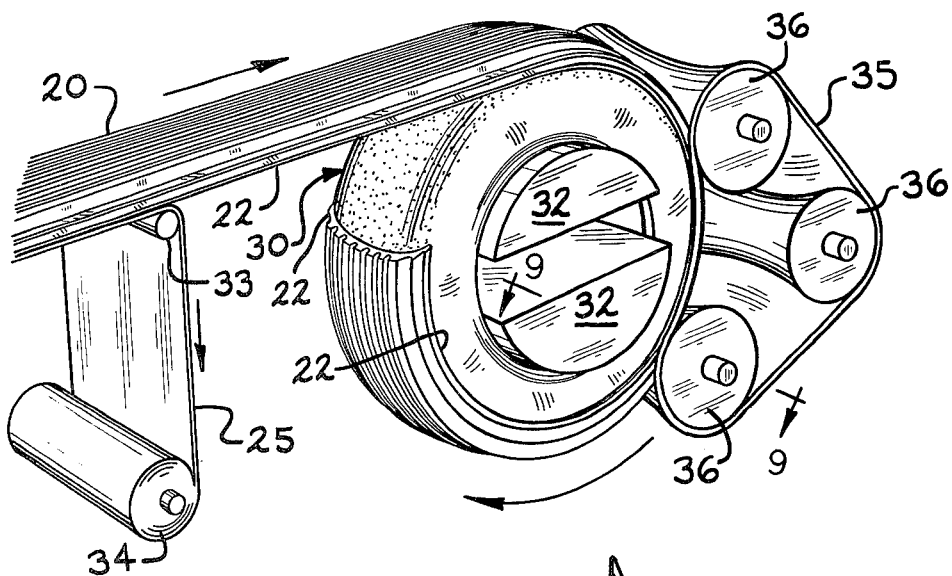
FIG. 8
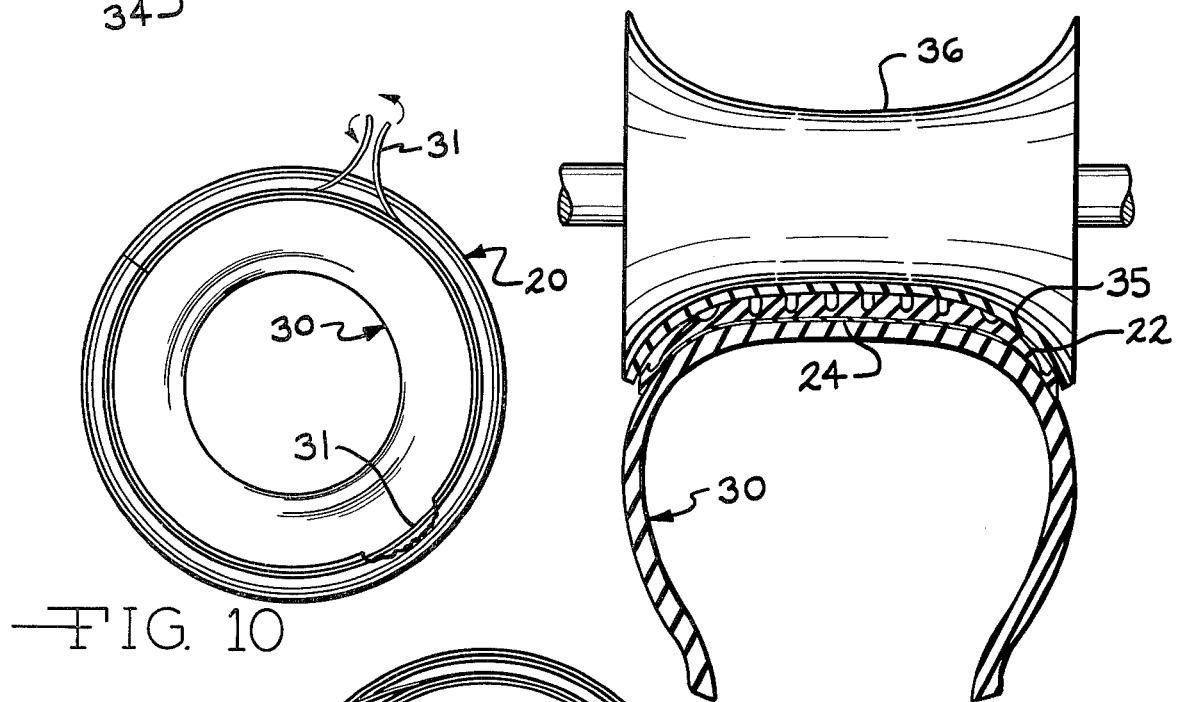
FIG. 10
FIG. 9
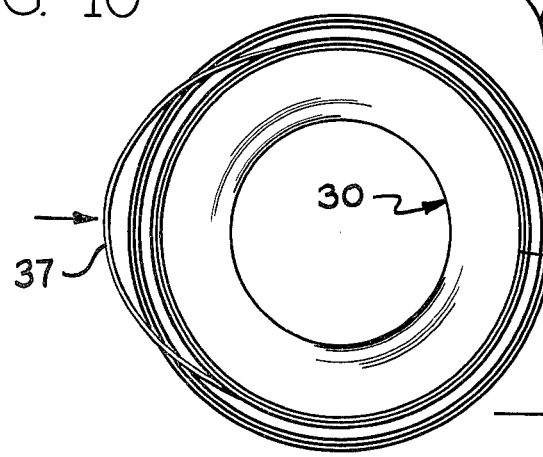
FIG. 11

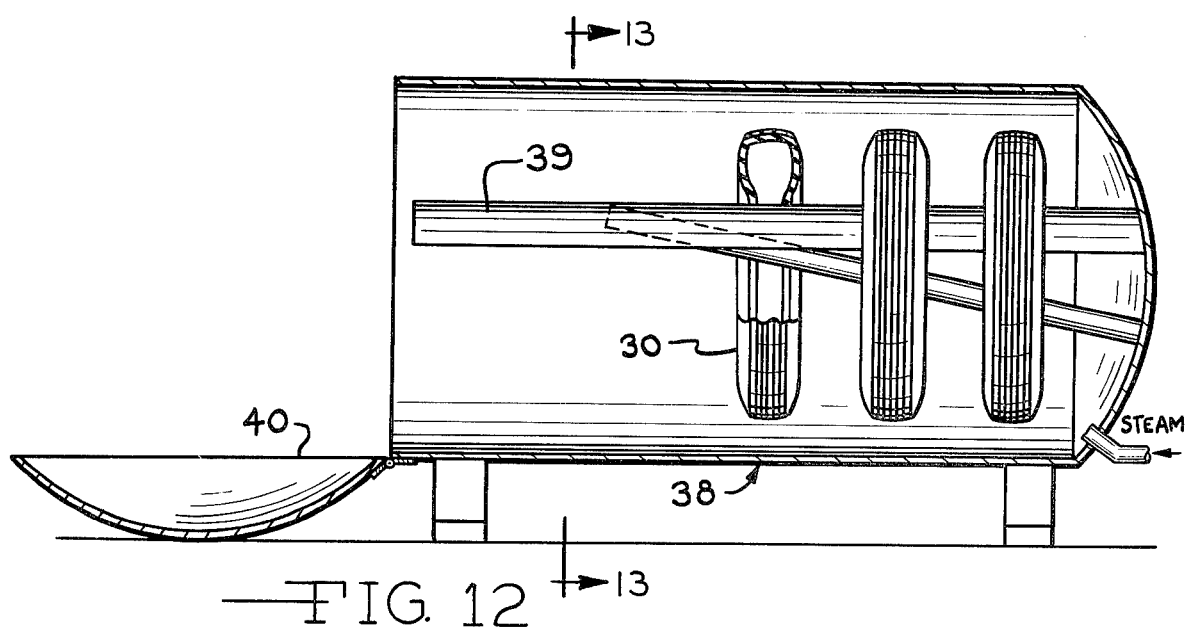
FIG. 12
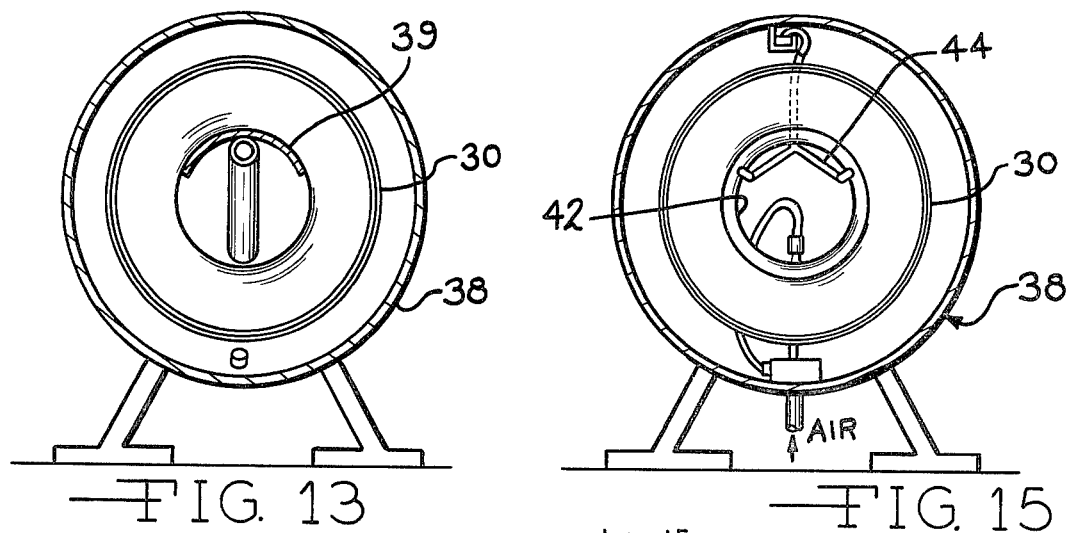
FIG. 13
FIG. 15
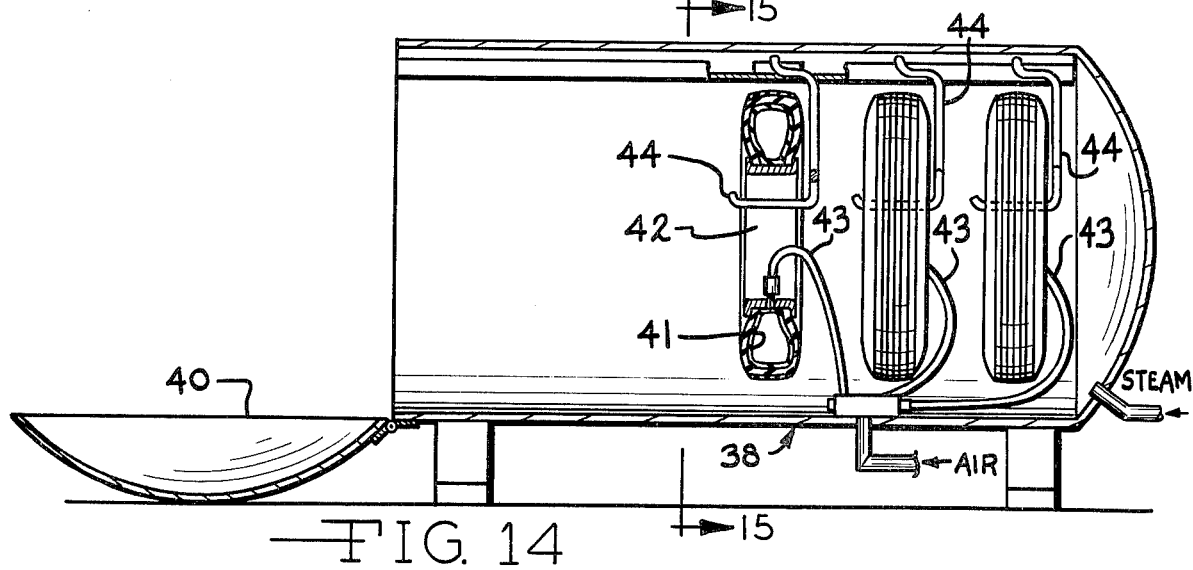
FIG. 14

PRE-CURED TREAD FOR RECAPPING TIRES AND METHOD FOR THE USE THEREOF

BACKGROUND OF THE INVENTION

Throughout the following specification and in the claims appended hereto the term "pre-cured" will be employed to describe pre-formed tire tread stock which is to be attached to the perimeters of buffed tire casings even though some preformed tread stocks are not completely cured, where originally fabricated but are only at least partially cured, while others are completely cured. The actual degree of pre-curing of the tread stocks embodying the invention and the method for the use thereof in re-capping tires are not critical in as much as the method when carried out completes any curing necessary to produce a completely cured, re-capped tire.

The use of pre-cured treads for recapping or retreading vehicle tires and some methods by which the pre-cured treads are attached to the casings of the vehicle tires are well known in the art. Among the more successful ones of these methods are those which employ curing envelopes. The pre-cured tread is stretched around and attached ("stitched") to the peripheral surface of a suitably buffed tire casing. An annular curing envelope, usually made of rubber, is stretched around the exterior surface of the tread. The external surface of the envelope is then exposed to fluid under pressure, for example, hot steam, while the air between the envelope and the tread is vented to atmosphere, to press the tread stock and an intermediate layer of unvulcanized rubber ("cushion gum") firmly against the surface of the tire casing and to hold the tread stock and cushion gum against that surface while the cushion gum (and the tread stock, if not fully pre-cured) is vulcanized by the heat and pressure ("cured") to firmly adhere the tread to the surface of the casing.

A problem exists in methods using a curing envelope in the conventional fashion, where the tread cross-section includes tapered edges or wings that are designed to curl around what might be called the shoulders of the tire casing itself. Even though the curing envelopes utilized in such methods have been extended laterally to go far around casing shoulders and even all the way around to the casing rim beads, the feather edge of a tapered wing frequently is not adequately adhered to the tire casing in methods utilizing curing envelopes.

The tendency of the tapered wings of the tread stock to lift away from the surface of the tire casing at the shoulders is greater, of course, when the configuration of the tread stock includes large lugs or raised sections of rubber which extend across the tread stock and must be bent when the tread stock is laterally curved to conform its under surface to the surface of the tire casing.

Another serious problem exists with this method which is difficult to overcome, particularly with complex tread designs having narrow grooves in their outer or "earth contacting" surfaces. Attempts have been made to force the curing envelope downwardly into such narrow grooves but frequently air remains in the grooves beneath the surface of the curing envelope due to the envelope's inability to conform to the tread design. The remaining air insulates the rubber at the bottom of the groove from the curing steam so that the parts of the tread stock and cushion gum beneath the grooves are not adequately heated or pressurized to effect a tight bond to the surface of the tire casing.

It has been suggested that incompressible lengths of material be placed in such grooves in order that the curing envelope will press upon that material and that material will press downwardly upon the cushion gum and tread stock material at the bases of the grooves. While this may press the tread stock against the tire casing more effectively, it still insulates that portion of the cushion gum from the heat. As a result, the adhesion of the pre-cured tread to the surface of the casing is not uniform across the width of the tread.

It is therefore the principal object of the instant invention to provide a pre-cured tread stock for recapping vehicle tires which is so designed as to enable the wings of the tread stock to be mechanically retained and squeezed tightly against the surface of the tire casing during the curing process.

It is another important object of the invention to provide a method for carrying out retreading or re-capping using the pre-cured tread stock of the invention by which method the assembly of the tread stock and cushion gum is held tightly against the surface of the tire casing during the curing process.

BRIEF DESCRIPTION OF THE DRAWINGS

FIG. 1 is a vertical sectional view across a tire tread stock embodying the invention;

FIG. 2 is a vertical sectional view across the body of a truck tire casing showing the tread stock of FIG. 1 adhered or "stitched" in place in an initial step of the retreading process;

FIG. 3 is a fragmentary, greatly enlarged vertical sectional view illustrating how the tread stock embodying the invention mechanically is held tightly in place by a retainer according to the invention;

FIG. 4 is a view similar to FIG. 1 but showing a precured tread stock embodying the invention including wings of greater lateral extent;

FIG. 5 is a view similar to FIG. 2 showing how the tread stock of FIG. 4 is adhered or stitched to the exterior surface of a buffed tire casing;

FIG. 6 is a view similar to FIG. 3 showing how the tread stock illustrated in FIG. 4 and 5 is held in place by retainers according to the invention, FIG. 6 being illustrated on a scale larger than FIGS. 4 and 5;

FIG. 7 is a fragmentary view similar to FIG. 6 and showing how the outermost portion of the wings of a tread stock embodying the invention is removed after the tread stock has been cured in place on a casing;

FIG. 8 is a fragmentary, diagrammatic view in perspective illustrating how a continuous length of tread stock embodying the invention is laid around and stitched to the peripheral surface of a buffed tire casing;

FIG. 9 is a fragmentary, simplified sectional view taken along the line 9—9 of FIG. 8 and shown on an enlarged scale;

FIG. 10 is a side view in elevation showing a tire casing to which a tread stock embodying the invention has been stitched and illustrating how a retainer may be laid in the grooves in the wings of the tread stock and tightened to mechanically retain the wings against the adjacent surfaces of the tire casing during the curing process;

FIG. 11 is a view similar to FIG. 10 but illustrating the utilization of a continuous loop retainer which is placed in the grooves in the wings of the tread stock and then allowed to retract to squeeze the wings against the shoulders of the tire casing;

FIG. 12 is a longitudinal, vertical sectional view illustrating how tire casings to which tread stocks embodying the invention have been stitched and on which they are retained, may be placed in a conventional autoclave for carrying out the curing process;

FIG. 13 is a vertical sectional view taken along the line 13—13 of FIG. 12;

FIG. 14 is a view similar to FIG. 12, again illustrating how tire casings to which tread stock embodying the invention has been stitched may be mounted within an autoclave when the tire casings are rim mounted and supported by inflated inner tubes; and FIG. 15 is a fragmentary, vertical sectional view taken along the line 15—15 of FIG. 14.

DESCRIPTION OF PREFERRED EMBODIMENTS

FIG. 1 is a sectional view extending transversely of a pre-cured tread stock generally indicated by the reference number 20 which comprises a tread portion 21, two lateral sides or wings 22 and which has a base 23. The tread stock also comprises a thin layer of unvulcanized rubber or cushion gum 24 which is adhered to the base of the tread stock 20. The cushion gum layer 24 is covered by a thin protective film 25, frequently made of polyethylene.

Each of the wings 22 has a thin, side section or wing 26 along the outer edge of which extends a thicker "hook-shaped" portion 27. The inner side of the hook-shaped portion 27 defines the outer side of a groove 28, the grooves 28 extending longitudinally throughout the length of the tread stock 20.

The actual cross-sectional configuration shown in FIG. 1 is merely illustrative and, with the exception of the relationship of the tread portion 21 and wings 22, does not constitute a part of the instant invention. The tread configuration shown in FIG. 1 comprises a plurality of longitudinally extending narrow grooves so that this particular configuration might be fabricated by merely extruding it through a suitable die. However, other tread configurations comprising transversly extending lugs probably would have to be molded in suitable dies of such lengths as to provide tread stock 20 in sufficient length or lengths to be wrapped around or placed upon the outer perimeter of a tire casing to which the tread stock is to be vulcanized.

A tire casing 30 is shown in cross-section in FIG. 2. No attempt has been made in this figure to precisely illustrate the configuration of any particular tire casing but only generally to indicate its shape and to show how its peripheral surface is buffed or otherwise appropriately configured to receive a new tread, particularly a pre-cured tread stock 20 according to the invention. Of course, before the tread stock 20 is wrapped around and stitched to the buffed surface of the tire casing 30, the protective film 25 is stripped away to expose the undersurface of the uncured cushion gum layer 24 so that the cushion gum layer 24 is in direct contact with the buffed surface of the casing 30 as and after the tread stock 20 is placed on the casing. It will be noted in FIG. 2 that when the tread stock wings 22 are bent around the surface of the casing 30 the grooves 28 open generally upwardly and inwardly.

The tread stock 20 and the underlying layer of cushion gum 24 are placed upon and stitched to the buffed surface of the tire casing 30, the edges of the two wings 22 are brought into contact with the outer surface of the casing 30 at or outwardly of its "shoulder." In so bending the wings 22 around the shoulders of the casing 30, the grooves 28 are now directed with their open sides extending radially outwardly for the reception of mechanical retainers such as the retaining wire 31 shown in FIG. 3. After the tread stock has been wrapped around and stitched to the buffed peripheral surface of the casing 30, the operator then lays or places a length of retainer wire 31 in each of the grooves 28 and tightens the retainer wire 31, for example by twisting its ends together, so that it presses tightly radially inwardly to squeeze the entire wing 22 against the cushion gum 24 and, in turn against the surface of the casing 30.

As will be discussed below, the tread stock of the instant invention and the method for its utilization comprehend not only the use of lengths of wire such as the wires 31 for retaining the wings 22 in place but also the use of other forms of retainers. The objective, however, of each retainer employed is to mechanically squeeze the respective wing 22 tightly into place against the cushion gum layer 24 and the casing 30 during the curing process.

FIG. 4 is a cross-sectional view similar to FIG. 1 but showing an illustrative section of a tread stock 20a which comprises much wider wings 22a, a backing layer of cushion gum 24a and a protective film 25a. Each of the wings 22a has a thin section 26a and an outermost hook-shaped portion 27a the inner edge of which defines a retainer receiving groove 28a.

As in the case of the earlier described tread stock 20, the tread stock 20a with its layer of cushion gum 24a is wrapped or placed and stitched to the perimeter and against the buffed surface of a tire casing 30a as shown in FIG. 5. As the wings 22a are bent around the shoulders of the casing 38a, the retainer grooves 28a are swung downwardly so that they open generally radially outwardly for the reception of mechanical retainers 31a (FIG. 6). Again, it will be observed that the layer of cushion gum 24a is thinner at the outer sides of the wings 22a so that when the tread stock has been cured in place on the surface of the casing 30 or 30a, as the case may be, the respective one of the hook-shaped portions 27 or 27a can be removed by being buffed or cut away, as illustrated in FIG. 7, and the outer surfaces of the wings 22 or 22a blended into the contour of the sidewall surfaces of the casings 30 or 30a.

METHOD

In carrying out the method for re-capping or retreading a buffed tire casing with a pre-cured tread stock of the invention, a continuous length or a series of shorter lengths of pre-cured tread stock, such as those illustrated in FIGS. 1 and 4, is placed upon the exterior, pre-buffed surface of a tire casing, as is diagrammatically illustrated in FIG. 8. In FIG. 8 the tire casing 30 which has previously been buffed to provide an outermost or perimeter surface of proper cross-sectional configuration, is mounted upon an arbor 32. If available, a continuous length of pre-cured tread stock, for example the tread stock 20, is fed from a supply over a roller 33 around which the protective film 25 is led to a take-up roll 34. Shorter lengths of tread stock also may be employed, the lengths being abutted and laid on the casing in sequence. After the protective film 25 is stripped away from the base of the tread stock 20, the under surface of the cushion gum 24 is exposed. This surface is somewhat tacky due to its unvulcanized condition. A coating of rubber cement is then spread on the buffed surface of the casing. The leading end of the length of tread stock 20 is pressed onto the surface of the casing 30. The arbor 32 is then caused to rotate and the tread stock is fed onto the casing 30.

As an illustration of a way in which the tread stock and cushion gum may be stitched onto the casing, FIG. 8 shows a belt 35 which is led over a pair of spaced, spool-shaped pressure rollers 36 which squeeze the belt 35 tightly against the outer surface of the tread stock 20 and fold the tread stock wings 22 around the shoulders of the casing 30 into contact with the entire pre-buffed surface of the casing 30 as can best be seen in FIG. 9. This action exudes air from between the surfaces of the cushion gum 24 and the casing 30 and squeezes the wings 22 downwardly so as to press the surface of the cushion gum 24 against the casing 30. The apparatus shown in FIGS. 8 and 9 is not a part of the instant invention but merely is illustrative of the steps carried out to mount the tread stock on a tire casing. Other conventional apparatus such as a stitching wheel may be used instead if desired.

When a sufficient single length or number of pieces of tread stock 20 has been thus placed on the exterior surface of the casing 30, the operator cuts the tread stock 20 and nestles its ends together. He then continues the rotation of the casing with the tread stock thereon past the rollers 36 until he sees that the tread stock has been adhered to the casing 30.

After the stitching step, the operator removes the casing 30 with the tread stock 20 thereon from the arbor 32 and lays or stretches a length of retainer, for example a retaining wire 31 around each side of the tread stock 20 placing the retainers 31 in the grooves 28 at the outsides of the wings 22. As is diagramatically illustrated in FIG. 10, the operator may then twist the ends of retainer wire 31 together, tightening them circumferentially to mechanically force the tread stock wings 22 into intimate contact with the surface of the casing 30.

While a wire is illustrated as a retainer in FIG. 10, the ends thereof being twisted together to draw the wire tightly into the retaining grooves 28, the concept of the invention is not limited to the use of a wire but comprehends the utilization of other means for mechanically squeezing the tread wings 22 against the shoulder portions of a tire casing 30 prior to and during the curing step. For example, as is illustrated in FIG. 11, the retainer may be a continuous loop of resilient material which is stretched around a casing 30 and then allowed to retract into the respective one of the retaining grooves 28 to continue to exert inwardly compressing force against the wings 22.

As a further alternative, the retainer may be fabricated from a material which will shrink after it has been placed in the retaining grooves 28 during the curing process. Retaining cords or strands which are found to be effective in this fashion include those made from nylon, rayon or polyester.

FIGS. 12 and 13 illustrate how a plurality of tire casings provided with pre-cured treads may be assembled within an autoclave generally indicated by the reference number 38. For example, each of the casings may be supported by a quarter circle saddle 39, or the like, erected within the autoclave 38 and thus both its interior and exterior are exposed to the heat and pressure generated by steam admitted into the autoclave 38 after its door 40 has been closed. The arrangement illustrated in FIGS. 12 and 13 is satisfactory when the casings being treated are sufficiently stiff, as for example, steel radial passenger or truck tires or the like, to enable them to retain their proper shape while mounted in the fashion illustrated and subjected to the necessary heat and pressure in order to effect curing of the cushion gum layer 24 (and the tread stock if not previously fully cured) to adhere the tread stock 20 to the exterior surface of the casing 30.

When the casings of the tires being retreaded have insufficient structural integrity to retain their shapes, each of the casings 30 may be provided with an inflatable inner tube 41 and "rimmed," i.e. mounted upon a suitable road or collapsible rim 42. Each of the inner tubes is then connected to an air line 43, the rimmed tires are hung on support hooks 44 and slid into the autoclave 38. After the autoclave is closed high pressure steam is admitted to its interior. Simultaneously, air or steam is fed to the inner tubes 41 to a pressure at least equal to the pressure in the autoclave in order to support the tire casings against collapse.

By reason of the inward compressive action of the retainers 31,31a, or 37, or the like, during the curing process, not only are the wings 22 or 22a more tightly squeezed against the surfaces of the respective casings, but also, by suitably selecting the material from which the retainers are fabricated, the pre-cured tread stock is stetched slightly transversely of its circumferential extent both to squeeze the cushion gum against the surface of the tire casing 30 and to assure that no trapped air remains in the inter-spaces between the bases of the tread stocks 20, the cushion gum layers 24, and the surfaces of the casings 30.

After a suitable period of time within the autoclave 38 to accomplish the curing of the cushion gum layers 24, (and the tread stock, if necessary), the retreaded casings 30 are removed from the autoclave 38. The retainers are disengaged from the hook-shaped portions 27 and 27a and taken out of their retainer grooves 28 and 28a. Thereafter, the retreaded casings 30 are mounted upon a suitable mechanism and rotated in order that the hook-shaped portions 27 or 27a may be buffed or cut away, further "feathering" the outermost portions of the wings 22 or 22a to blend them into the contour of the side walls of the casings 30. If the material from which the retainers 31 or 31a or 37 are fabricated is such that it adheres to the rubber of the hook-shaped portions 27 and 27a, the retainers also may be removed by buffing and/or cutting them away.

Having described my invention, I claim:

1. A method for applying a pre-cured tread stock to a tire casing, said tread stock having a central portion adapted to have a tread pattern thereon and further having an outer annular ground contacting surface and terminal end portions at the edges of the central portion, each of said terminal end portions having seat means thereon adapted to receive retaining means, said seat means on each of the terminal end portions being positioned radially inwardly of the outer surface of the central portion, said method comprising the steps of:

placing a sufficient length or lengths of said tread stock on the perimeter of a tire casing to circumscribe said casing with the central portion and outer annular ground contacting surface thereof overlying the central portion of said tire casing in ground contacting position, pressing the underside of said central portion of said tread stock tightly against the surface of said tire casing to exclude air from therebetween, positioning retaining means in each of said seat means in each of the terminal end portions for squeezing said terminal end portions tightly against the surfaces of said casing, curing said tread stock into place on said casing and, removing said retaining means.

2. A method according to claim 1 in which the curing step consists of placing the tire casing with the tread stock and retaining means thereon, into an autoclave and placing said autoclave under heat and pressure at a temperature and pressure for a time sufficient to vulcanize said tread stock to said tire casing.

3. A method according to claim 2 in which an inner tube is placed inside the tire casing, the casing is rimmed and the inner tube is inflated while in the autoclave to a pressure at least equal to the curing pressure in said autoclave.

4. A method according to claim 1 in which each of the retaining means is a length of steel wire.

5. A method according to claim 1 in which each of the retaining means is an elongate member of a material which has a coefficient of expansion such that it increases its length under curing temperature less than the increase in circumference of the contacted side wall of the seat means.

6. A method according to claim 1 in which the retainer means is a loop of stretchable material which contracts after wrapping in the seat means and does not increase in length under curing temperature.

7. A method according to claim 1 in which the retainer means shrinks in length under the curing temperature.

8. A method according to claim 1 and the additional step of removing that portion of each end portion forming the outer, retainer-contacting wall of the seat means.

9. A method for applying a pre-cured tread stock to a tire casing, said tread stock having a central portion having an outer annular ground contacting surface and terminal end portions at the edges of said central portion, said method comprising the steps of:

placing sufficient length of lengths of said tread stock on the perimeter of a tire casing to circumscribe said casing with the central portion overlying the central portion of said tire casing in ground-surface contacting position, pressing the underside of said central portion of said tread stock tightly against the surface of said tire casing to exclude air from therebetween, positioning retaining means circumferentially around and against each of said terminal end portions for engaging said terminal end portions tightly against the surfaces of the shoulder portion of said casing, curing said tread stock into place on said casing and, removing said retaining means.

10. A method according to claim 9 in which each of the retainer means includes a length of steel wire.

11. A method according to claim 9 in which each of the retainer means comprises a material having a co-efficient of expansion such that it increases its length under curing temperature less than the increase in circumference of the contacted surface of the respective terminal end portion.

12. A pre-cured strip of tread stock for a tire casing comprising:

a central portion adapted to have a selected tread pattern thereon, said central portion further having an outer ground contacting surface, terminal end portions extending only laterally outwardly from the edges of said central portion, and seat means adapted to receive retaining means adjacent to the edge ends of each of said terminal end portions extending only laterally outwardly, said seat means positioned radially inwardly of the outer surface of the ground contacting surface of said central portion when the pre-cured tread stock has been positioned upon the periphery of the tire casing and shaped to the crossection of the casing and adapted for receiving and holding said retaining means in place for firmly holding all of said central portion and said terminal end portions against the tire casing.

13. A pre-cured tread stock in accordance with claim 12 wherein said terminal end portions extending laterally outwardly therefrom include thinner, parallel sidewings at the edges of said annular ground contacting surface portion.

14. A pre-cured tread stock in accordance with claim 13 wherein said seat means includes a longitudinally-extending groove therein with said outer side of said groove being defined by a generally inwardly turned outer sidewall with said groove extending circumferentially relative to said casing and radially outward hook-shaped profile when said tread stock is placed upon the periphery of said casing.

15. A pre-cured tread stock according to claim 12 further includes a thin layer of unvulcanized rubber on the underside of said tread stock.

16. A pre-cured tread stock according to claim 2 further includes a removable sheet of resinous material adhered to the layer of unvulcanized rubber on the side thereof opposite the tread stock.

* * * * *